Patented Nov. 6, 1928.

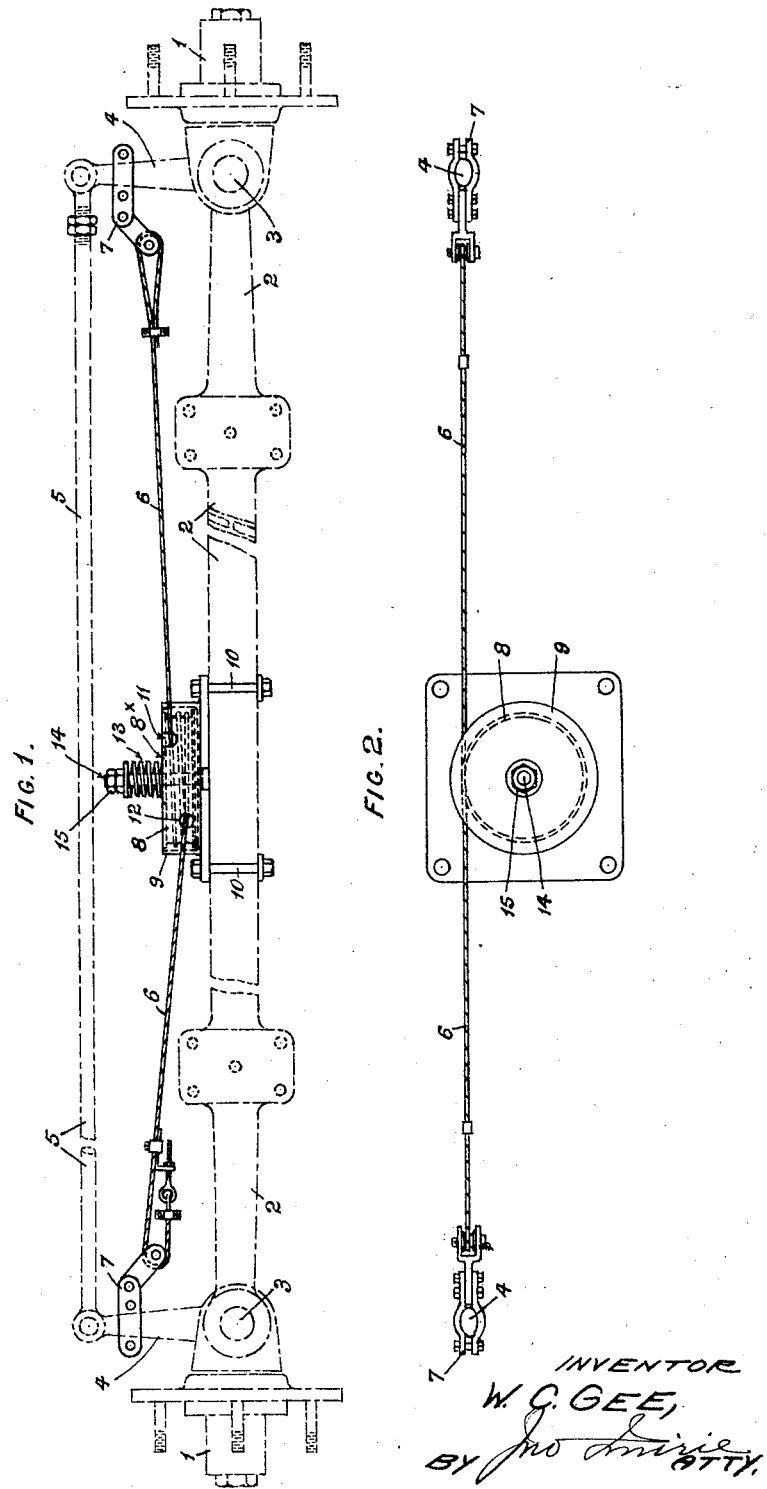

1,690,289

UNITED STATES PATENT OFFICE.

WILLIAM CHARLES GEE, OF ROCK FERRY, ENGLAND.

STEERING-GEAR CONTROL.

Application filed November 29, 1926, Serial No. 151,538, and in Great Britain August 26, 1926.

This invention has reference to the steering gears or mechanisms of vehicles, mainly self propelled vehicles, in which the steering wheels are mounted on stub axles, carried on vertical axes on or in the ends of the axle tree or shaft, and these vertical pivoted stub axles are moved by arms thereon, standing at right angles to the axle tree, and usually connected together by a connecting rod or bar, and moved by the steering gear of the vehicle.

In steering gears of vehicles of the kind referred to it is known that after use for a relatively small length of time, the steering wheels, when running, are apt to wobble in their normal vertical planes, which is not only objectionable generally or mechanically, but is also objectionable to the travellers in the vehicles, as this wobble action is transmitted to the body of the vehicle, and so to the travellers; and the primary object of this invention is to eliminate this wobble or vibratory action of the wheels, and at the same time to provide a means, which is simple and inexpensive by which this end is accomplished, and which at the same time is effective.

The means according to this invention by which the above ends are secured is adapted to be attached to and used in connection with, not only new vehicle steering gears designed or provided with the invention, but also with existing vehicle steering gear of the kind referred to, constituting in such cases an attachable mechanism thereto; and for convenience the invention will be described mainly as applied in this form.

To the two arms or parts connected with the stub axle operating mechanisms is connected a connecting means—preferably flexible—by which a tension on them is exerted, and they are permanently pulled or pressed in relation to one another, so that there is never any slackness in the arms and their connections or joints; and therefore there is no freedom for the wheels to wobble or vibrate out of the normal planes; and at the same time, while there is tension on this connecting device, the steering arms and gear can be readily moved in both directions as required. After such a movement, i. e. when the connecting device is moved, the latter will be held automatically by a frictional device, which nevertheless, at other times when the device is in action or movement, does not interfere with the movement of the gear or mechanism.

In one form the connecting medium of the mechanism which connects the two arms together, is of wire rope, which is adjustable, say by a screw and nut tension device, connected to said wire or one end of same, and by means of which the required tension on the rope can be obtained; and if slackness in the gear through wear and tear takes place, by tightening up this tension device, such slackness can be taken out of the mechanism, and it is rendered firm and taut.

The centre portion of this wire rope means is acted upon by frictional tension device as above described, and an advantageous mode of obtaining the frictional holding may consist in passing the rope a plurality of times round a pulley mounted on an axis clamped to the inside face of the axle tree, and arranging the pulley to be pressed upon, by a braking or friction disc which is pressed on to it by means of a spiral or other spring, so that by this spring the frictional holding is produced, and so the wire passing round it will always be taut; and while it permits of movement in the act of steering or operating the steering gear, at other times it is held by the friction sufficiently firmly to prevent the wire, and so the arms of the steering gear from moving.

When the invention is applied to vehicles especially constructed and adapted to have the effect specified accomplished, the parts above specified may be made to form part of the arms; or the arms and axle may be especially constructed and adapted to have applied to them the mechanism according to the invention.

The steering gear or mechanism, the nature of which is above described, is illustrated in connection with the annexed drawings, in which Figure 1 is a plan, and Figure 2 an elevation.

In the drawings, 1 represents the stub axles of the steering wheels of a self propelled vehicle, 2 is the main front axle, 3 is the vertical pivot of the stub axles, 4 are the usual arms connected with the stub axle pivot joint part, and 5 the connecting bar, which is operated from the steering gear of the vehicle, as usual.

In the case shown in the drawings, the means or apparatus by which the two arms 4 are kept taut, that is tension or pressure is kept on them, and they are permanently pulled towards one another, so as to avoid slackness, resulting in the wobble of the wheels, consists of a wire rope 5 which is adjustable, and the ends of which are connected by connecting devices or clamps 7, with the steering arms 4; whilst the centre part is fixed to or passed over a pulley or barrel 8, having a helical groove in its surface in which turns or convolutions of the ropes or cord lie, and fitting in a casing 9, attached to one of the vertical faces of the axle tree 2, by means of bolts 10.

From one arm 4 the rope 6 is passed through an opening 11 in the casing 9, whilst the part connected with the other arm passes through an opening 12 in another part of the casing 9; and the pulley or barrel 8 is permanently pressed on to the bottom of the casing 9, by a spring 13, which surrounds the spindle 14, fixed in the bottom of the casing 9, and is kept under strain by the nut 15 screwing over the end of the spindle; the inner end of the spring resting on a disc 8×, which lies on the face of the pulley. Hence the pulley or barrel is always under the action of a spring brake, and consequently the parts are kept firm and taut.

The ends of the ropes 6 pass over little pulleys on the ends of the clips 7, and the right hand end in the figure is secured or clamped on to the body of the rope or cord by a clamp 16; while the other end of the rope is passed over a pulley on the other clip 7, and is passed through an eye of an adjusting bolt 17, and clamped on the body of the rope by a clamp 16, similarly as the former clamp 16; and this adjusting threaded bolt 17 passes through one part of an angle device 18, clamped on to the rope 6 by a clamp 19, and is provided on the backside of said angle device with a nut, by the screwing up or down of which on the bolt 17, any tension required may be put into the rope or cord 6.

It will be seen that the appliance shown in the drawings, and described in connection with them, is adapted to be fitted to an existing self propelled vehicle, and in a short time, it only being required to secure the central pulley case 9 with its contained parts to the inner face of the axle tree 2 by the bolts 10, and attaching the clamps 7 on the steering arms 4, and adjusting the rope to the required tension by means of the screw 17.

What is claimed is:—

1. Means for preventing the steering wheels of self-propelled vehicles from wobbling, in combination an axle tree, pivoted stub axles on the ends of same, steering arms on said stub axle parts, a flexible connecting medium connected with said steering arms, a rotative barrel over which the said flexible medium is passed, a case in which the said barrel is disposed connected with and supported from the axle tree, a spring above the barrel and case, adapted to act on the barrel to serve as a frictional resistance to its rotation, and a screw adjusting device on the upper end of the spring to vary the friction braking action on the barrel.

2. Means for preventing the steering wheels of self-propelled vehicles from wobbling, in combination an axle tree, pivoted stub axles on the ends of same, steering arms on said stub axle parts, a flexible connecting medium connected with said steering arms, a rotative barrel over which the said flexible medium is passed, a case in which the said barrel is disposed connected with and supported from the axle tree, a spring above the barrel and case adapted to act on the barrel to serve as a frictional resistance to its rotation, a screw adjusting device on the upper end of the spring to vary the friction braking action on the barrel, and adjusting means on the flexible connecting medium adapted to adjust and put tension on same.

In testimony whereof I have signed my name to this specification.

WM. CHAS. GEE.